(12) United States Patent
Zhao

(10) Patent No.: US 12,212,454 B2
(45) Date of Patent: Jan. 28, 2025

(54) DATA TRANSMISSION METHOD AND SYSTEM IN TIME-SENSITIVE NETWORK

(71) Applicant: ZHEJIANG LAB, Hangzhou (CN)

(72) Inventor: Xuyang Zhao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/041,538

(22) PCT Filed: Nov. 22, 2022

(86) PCT No.: PCT/CN2022/133544
§ 371 (c)(1),
(2) Date: Feb. 13, 2023

(87) PCT Pub. No.: WO2023/093727
PCT Pub. Date: Jun. 1, 2023

(65) Prior Publication Data
US 2024/0267288 A1    Aug. 8, 2024

(30) Foreign Application Priority Data
Nov. 26, 2021 (CN) .......................... 202111416380.3

(51) Int. Cl.
*H04L 41/0803*  (2022.01)
*H04J 3/02*  (2006.01)
*H04L 41/12*  (2022.01)

(52) U.S. Cl.
CPC ............ *H04L 41/0803* (2013.01); *H04J 3/02* (2013.01); *H04L 41/12* (2013.01)

(58) Field of Classification Search
CPC ......... H04L 41/0803; H04L 41/12; H04J 3/02
USPC ........................................................ 709/220
See application file for complete search history.

(56) References Cited

U.S. PATENT DOCUMENTS

| 2018/0006955 A1 | 1/2018 | Bush et al. | |
| 2020/0136894 A1 | 4/2020 | Bush et al. | |
| 2020/0259896 A1* | 8/2020 | Sachs | H04W 56/0065 |
| 2021/0227452 A1* | 7/2021 | Munz | H04L 41/0806 |

(Continued)

FOREIGN PATENT DOCUMENTS

| CN | 110048869 A | 7/2019 |
| CN | 111970212 A | 11/2020 |

(Continued)

OTHER PUBLICATIONS

ISA State Intellectual Property Office of the People's Republic of China, International Search Report Issued in Application No. PCT/CN2022/133544, Feb. 20, 2023, WIPO, 9 pages.

(Continued)

*Primary Examiner* — Wing F Chan
*Assistant Examiner* — Leon Y Tseng
(74) *Attorney, Agent, or Firm* — McCoy Russell LLP

(57) ABSTRACT

The present disclosure discloses a data transmission method and system in time-sensitive network, which relates to the technical field of time-sensitive network of industrial Internet. The devices include multiple industrial end stations, multiple time-sensitive network switches and a network configuration operating system. In the present disclosure, the method and system can effectively reduce the processing time overhead of time-sensitive data in devices and is compatible with traditional Ethernet data transmission.

8 Claims, 2 Drawing Sheets

(56) References Cited

U.S. PATENT DOCUMENTS

2022/0075354 A1* 3/2022 Nixon .............. G05B 19/41835
2022/0166720 A1* 5/2022 Jabbar .................... H04L 47/17

FOREIGN PATENT DOCUMENTS

| CN | 112073388 | A | 12/2020 | |
| CN | 112637251 | A | 4/2021 | |
| CN | 112702282 | A | 4/2021 | |
| CN | 112953830 | A | 6/2021 | |
| CN | 113347065 | A | 9/2021 | |
| CN | 113691385 | A | 11/2021 | |
| CN | 113852644 | A | 12/2021 | |
| WO | 2020081062 | A1 | 4/2020 | |
| WO | WO-2023288055 | A1 * | 1/2023 | ......... H04L 41/0894 |

OTHER PUBLICATIONS

ISA State Intellectual Property Office of the People's Republic of China, Written Opinion of the International Searching Authority Issued in Application No. PCT/CN2022/133544, Feb. 20, 2023, WIPO, 8 pages.

Jiang, X. et al., "SSA:CQF—oriented Scheduling Algorithm in Time—Sensitive Networking," Journal of Northeastern University (Natural Science), vol. 41, No. 6, Jun. 15, 2020, 8 pages.

State Intellectual Property Office of the People's Republic of China, Office Action and Search Report Issued in Application No. 202111416380.3, Jan. 4, 2022, 16 pages. (Submitted with Machine/Partial Translation).

State Intellectual Property Office of the People's Republic of China, Office Action and Search Report Issued in Application No. 202111416380.3, Jan. 19, 2022, 9 pages. (Submitted with Machine/Partial Translation).

* cited by examiner

DATA TRANSMISSION METHOD AND SYSTEM IN TIME-SENSITIVE NETWORK

CROSS REFERENCE TO RELATED APPLICATION

This application is a US National Phase of a PCT Application No. PCT/CN2022/133544 filed on Nov. 22, 2022, which claims priority to Chinese Patent Application No. 202111416380.3 filed on Nov. 26, 2021, the entire contents of which are incorporated herein by reference in their entireties.

TECHNICAL FIELD

The present disclosure relates to field of time-sensitive network technologies of industrial internet, in particular to a data transmission method and system in time-sensitive network.

BACKGROUND

With the development of the Industrial Internet of Things (IIoT), there are many devices from different manufacturers with different characteristics interconnected in the network. The devices are managed separately, data of the devices is transmitted based on Quality of Service (QOS), and the real-time performance of the devices is mainly handled through non-standard protocols from various manufacturers, such as profinet, cc-link and other industrial real-time protocols. Therefore, connectivity among the devices is poor, interconnection management for the devices is confused, and there is a lack of unified management for management address, device identification, interface identification and other information, which makes the utilization rate of the entire network is low, and increases the network construction cost for enterprises and network topology complexity.

The data transmission of the devices is transmitted based on QoS, which cannot meet the real-time requirements of data transmission, and the reliability of data transmission is low. As more and more devices being accessed, the coexistence of available bandwidth and different traffic types has become an important issue in the upstream channel of the factory backbone network. In the traditional link discovery protocol, in general, the main characteristics, management address, device identification (ID) and port ID of a device are sent to other devices accessing the unified local area network (LAN). However, for the device in the time network technology, the newly added frame preemption function makes it impossible for the traditional link discovery protocol to identify this function, which makes it impossible to distinguish between the time-sensitive network domain and the ordinary network domain, resulting in the data transmission without a deterministic function.

Compared with the traditional network, the device in the time-sensitive network has modified the physical media. For the devices in the time-sensitive network, the key indicators of time synchronization performance and data slicing technology are missing, leading to problems in device identification. Even if the interconnection between devices in the time-sensitive network is successful, functions time synchronization and data slicing may not work. In order to satisfy the transmission schedule for time-sensitive data with different priorities, the physical transmission media are divided into preemptive transmission channels and preempted transmission channels. The physical transmission data channels of traditional standard Ethernet are not classified, which is also the main difference between time-sensitive data transmission device and standard Ethernet data transmission device.

SUMMARY

In view of the deficiencies of the prior art, the present disclosure provides a data transmission method and system in time-sensitive network, which can automatically identify time-sensitive attributes of neighboring devices in a network, and meet plug-and-play and network configuration requirements for time-sensitive networks. The acquired time-sensitive domain information is reasonably planned to improve the utilization of network resources.

In a first aspect, a data transmission method in time-sensitive network is provided in the present disclosure, applied to a data transmission system in time-sensitive network, the system includes multiple time-sensitive network switches, multiple industrial end stations, and a network configuration operating system, the method includes:

for each of the multiple time-sensitive network switches, determining, by the time-sensitive network switch, a device linked with the time-sensitive network switch, and storing, by time-sensitive network switch, port information of the device, where the port information includes a value of additional Ethernet capability announcement information;

based on the value of additional Ethernet capability announcement information of the device, determining, by the time-sensitive network switch, time-sensitive processing capability of the device to determine whether the device supports time-sensitive network;

in response to determining that the device supports time-sensitive network, transmitting, by the time-sensitive network switch, port information of the device and the time-sensitive network switch to the network configuration operating system;

based on the obtained port information, determining, by the network configuration operating system, an IP address of the time-sensitive network switch, and initiating, by the network configuration operating system, a request for retrieving physical topology to the time-sensitive network switch by using a network management protocol YANG model; and after receiving the request for retrieving physical topology from the network configuration operating system, sending, by the time-sensitive network switch, a local clock type value, a port reservation bandwidth size, a path planning table of the time-sensitive network switch to the network configuration operating system according to an information table in the YANG model;

determining, by the network configuration operating system, the physical topology of the time-sensitive network based on the obtained port information; and planning, by the network configuration operating system, data transmission paths based on the physical topology;

where, planning, by the network configuration operating system, the data transmission paths based on the physical topology includes:

obtaining, by the network configuration operating system, local clock type values, port reservation bandwidth sizes, path planning tables of the plurality of time-sensitive network switches based on the physical topology, and collecting, by the network configuration operating system, network resource requirements through the plurality of time-sensitive network switches, where the network resource requirements include communication paths between the plurality of industrial end stations, and periods, sizes, and bounded latencies of time-sensitive streams; according to the time-sensitive streams, the physical topology and the network resource requirements, for each of the plurality of time-sensitive network switches, determining, by the network configuration operating system, a scheduling table of the time-sensitive streams for the time-sensitive network switch, and sending, by the network configuration operating system, the scheduling table to the time-sensitive network switch, such that the plurality of time-sensitive network switches conduct port traffic scheduling configuration according to received scheduling tables; when a new time-sensitive network switch is added into the time-sensitive network or a new time-sensitive stream is generated, repeating, by the network configuration operating system, the above steps to plan the physical topology again and redetermine a scheduling table.

In some embodiments, the time-sensitive network switch is connected by a single point-to-point network to operate.

In some embodiments, the value of the additional Ethernet capability announcement information is 16 bits in total, of which bit 0 indicates whether frame preemption function is supported or not, bit 1 indicates a state of the frame preemption function, bit 2 indicates whether the frame preemption function operation is enabled or not, bit [4:3] indicates a minimum number of bytes of the preemption frame, and bit [15:5] is a reserved field.

In some embodiments, a value of 1 indicates that the frame preemption function is supported, and a value of 0 indicates that the frame preemption function is not supported; for the bit 1, a value of 1 indicates that the frame preemption function is on, and a value of 0 indicates that the frame preemption function is off; for the bit 2, a value of 1 indicates that the frame preemption function is enabled, and a value of 0 indicates that the frame preemption function is disabled.

In a second aspect, a data transmission system in time-sensitive network is provided in the present disclosure, including: multiple industrial end stations, multiple time-sensitive network switches and a network configuration operating system. For each of the plurality of time-sensitive network switches, the time-sensitive network switch is configured to: determine a device linked with the time-sensitive network switch and store port information of the device, where the port information includes a value of additional Ethernet capability announcement information; determine, based on the value of additional Ethernet capability announcement information of the device, time-sensitive processing capability of the device to determine whether the device supports time-sensitive network; transmit, in response to determining that the device supports time-sensitive network, port information of the device and the time-sensitive network switch to the network configuration operating system, such that based on the obtained port information, the network configuration operating system determines an IP address of the time-sensitive network switch, and uses the network management protocol YANG model to initiate a request for retrieving physical topology to the time-sensitive network switch; and in response to receiving the request for retrieving physical topology from the network configuration operating system, send a local clock type value, a port reservation bandwidth size, a path planning table of the time-sensitive network switch to the network configuration operating system according to an information table in the network management protocol YANG model.

The network configuration operating system is configured to: determine the physical topology of the time-sensitive network based on the obtained port information; and plan data transmission paths based on the physical topology.

Where, planning the data transmission paths based on the physical topology includes: obtaining local clock type values, port reservation bandwidth sizes, path planning tables of the plurality of time-sensitive network switches based on the physical topology; collecting network resource requirements through the multiple time-sensitive network switches, where the network resource requirements includes communication paths between the multiple industrial end stations, and periods, sizes, and bounded latencies of time-sensitive streams; according to the time-sensitive streams, the physical topology and the network resource requirements, for each of the multiple time-sensitive network switches, determining a scheduling table of the time-sensitive streams for the time-sensitive network switch, and sending the scheduling table to the time-sensitive network switch, such that the multiple time-sensitive network switches conduct port traffic scheduling configuration according to received scheduling tables; when a new time-sensitive network switch is added into the time-sensitive network or a new time-sensitive stream is generated, repeating the above steps to plan the physical topology again and redetermine a scheduling table.

For networking application requirements for time-sensitive network, in the present disclosure, time-sensitive network devices and non-time-sensitive network devices in a network domain are identified by a value of additional Ethernet capability announcement information. Without increasing the time and complexity of data processing overhead, the characteristic identification of device for deterministic data transmission is maintained by the value of additional Ethernet capability announcement information. By the values of additional Ethernet capability announcement information of neighboring devices and related protocols, the requirements from the device supporting time-sensitive network in time-sensitive network are transmitted to the network configuration operating system, providing basic guarantee for bandwidth allocation and resource configuration of time-sensitive network, meeting the plug-and-play and network configuration requirements of the time-sensitive network, and improving the bandwidth utilization and the real-time and reliability of data transmission in the time-sensitive network.

DETAILED DESCRIPTION OF THE EMBODIMENTS

In combination with the drawings in the embodiments of the disclosure, the technical solutions in the embodiments of the disclosure will be described clearly and completely. Obviously, the described embodiments are only part of the embodiments of the disclosure, not all of them.

The development of industrial Internet technology and intelligent manufacturing solutions is realized based on the network coordination. Information Technology (IT) layer requires high bandwidth, while the Operational Technology (OT) layer requires low latency and high reliability. The physical transmission medium and the interface morphology for interconnection in the network have been determined, but there is no uniform standard for interoperability in heterogeneous networks. Time-sensitive network technology solves the problem of data transmission in the same network of "real-time" data and "non real-time" data, for example, solving the problems of clock synchronization, data scheduling and network configuration. In the process of network configuration, transmission path planning in time-sensitive network is required. There are three methods for the network configuration, which are centralized network management, distributed network management and hybrid network management. All three methods need to acquire and identify the device information in the network, and the device topology, device functions and resource configuration in the entire network are managed through the network configuration operating system. Where, the domain composed of devices supporting time-sensitive network is called time-sensitive domain, and the domain composed of devices supporting time-sensitive network under non time-sensitive network, or composed of devices supporting non time-sensitive network is called non time-sensitive domain. The devices supporting time-sensitive network can be electronic devices containing time-sensitive network chips, such as vehicles in the Internet of Vehicles. Time-sensitive network switches also include time-sensitive network chips, and devices supporting time-sensitive network can also be time-sensitive network switches. For the time-sensitive domain, according to a data transmission method and system in time-sensitive network provided by embodiments of the present disclosure, the information model characteristics of a neighboring time-sensitive network device is obtained, and the information model characteristics are transmitted to the network configuration operating system, the time-sensitive network topology and resource allocation scheme are established, which improves the bandwidth utilization and makes data transmission with a more real-time and reliable way in the time-sensitive network; data in the non time-sensitive network domain transmits according to the traditional data link discovery protocol.

Figure 1:
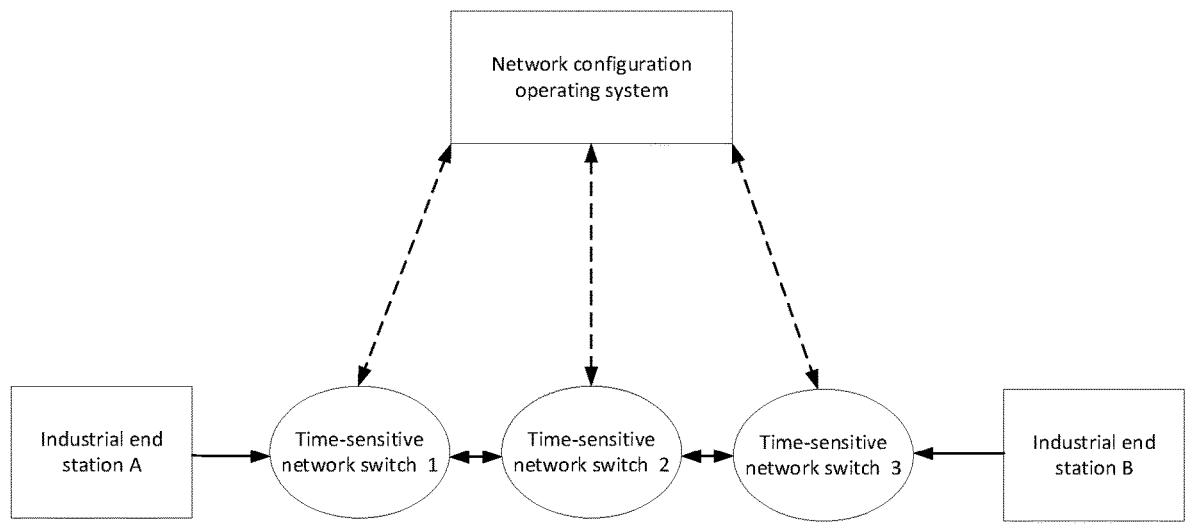
FIG. 1 is a structural diagram of a data transmission system in time-sensitive network of the present disclosure.
Figure 2:
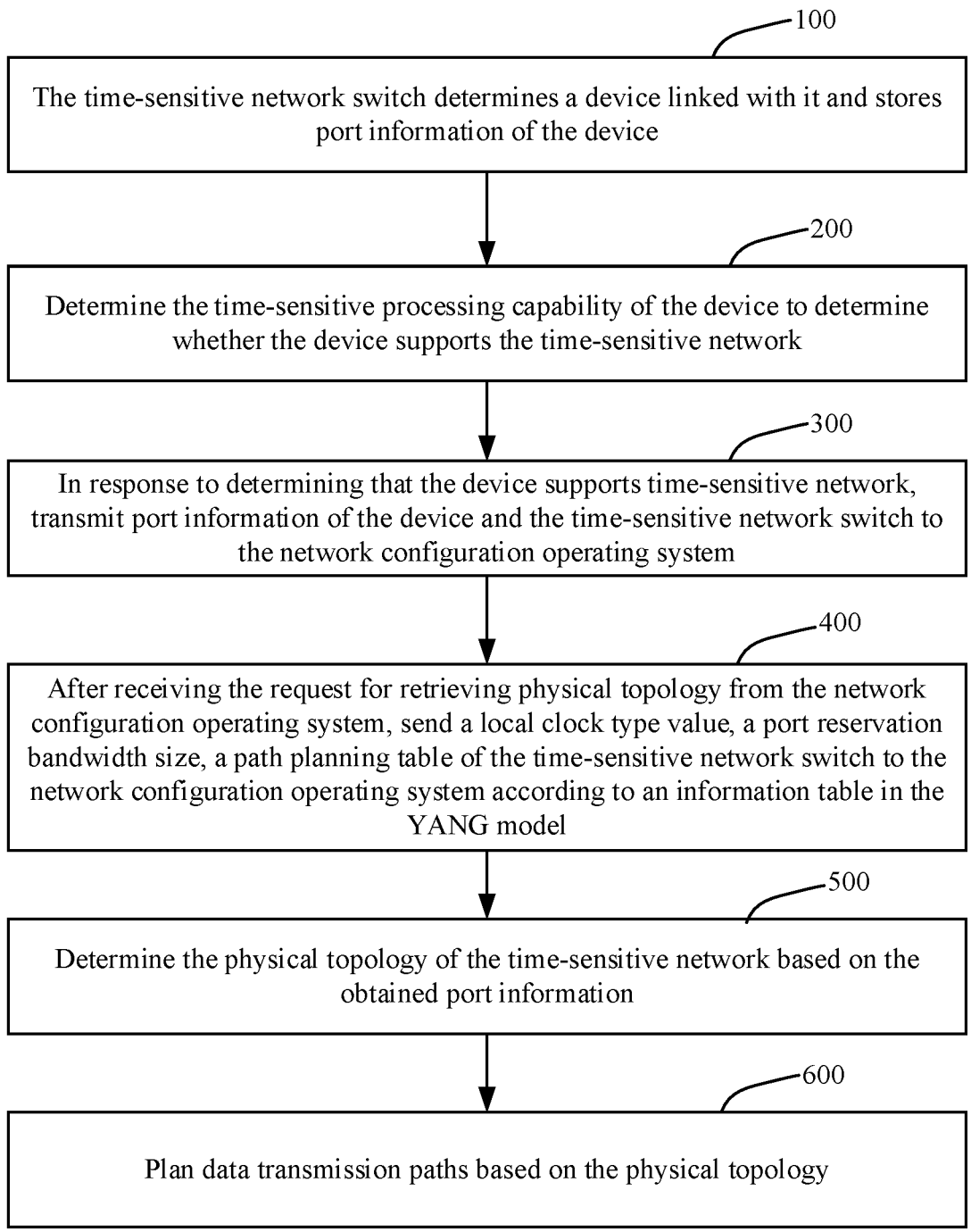
FIG. 2 is a flow chart of a data transmission method in time-sensitive network according to an embodiment of the present disclosure.

An embodiment of the disclosure provides a data transmission method in time-sensitive network, which is applied to a data transmission system in the time-sensitive network. As shown in FIG. 1, the system includes multiple time-sensitive network switches, multiple industrial end stations, and a network configuration operating system. As shown in FIG. 2, the data transmission method in time-sensitive network includes the following steps 100 to 600.

Step 100, for each of time-sensitive network switches: the time-sensitive network switch determines a device linked with it and stores port information of the device, where the port information includes a value of additional Ethernet capability announcement information.

Step 200, based on the value of additional Ethernet capability announcement information of the device, the time-sensitive network switch determines the time-sensitive processing capability of the device to determine whether the device supports the time-sensitive network.

Step 300, in response to determining that the device supports time-sensitive network, the time-sensitive network switch transmits port information of the device and the time-sensitive network switch to the network configuration operating system, so that based on the obtained port information, the network configuration operating system determines an IP address of the time-sensitive network switch, and uses the network management protocol YANG model to initiate a request for retrieving physical topology to the time-sensitive network switch.

Step 400, after receiving the request for retrieving physical topology from the network configuration operating system, the time-sensitive network switch sends a local clock type value, a port reservation bandwidth size, a path planning table of the time-sensitive network switch to the network configuration operating system according to an information table in the YANG model.

Step 500, the network configuration operating system determines the physical topology of the time-sensitive network based on the obtained port information.

Step 600, the network configuration operating system plans data transmission paths based on the physical topology.

In some embodiments, step 600 may include steps 610 to 630.

Step 610, the network configuration operating system obtains local clock type values, port reservation bandwidth sizes, path planning tables of the time-sensitive network switches based on the physical topology, and the network configuration operating system collects network resource requirements through the time-sensitive network switches, where the network resource requirements include communication paths between the industrial end stations, and periods, sizes, and bounded latencies of time-sensitive streams.

Step 620, according to the time-sensitive streams, the current physical topology and the network resource requirements, for each of the time-sensitive network switches, the network configuration operating system determines a scheduling table of the time-sensitive streams for the time-sensitive network switch, and sends the scheduling table to the time-sensitive network switch, so that the time-sensitive network switches can conduct port traffic scheduling configuration according to received scheduling tables.

Step 630, when a new time-sensitive network switch is added into the time-sensitive network or a new time-sensitive stream is generated, the network configuration operating system repeats the above steps to plan the physical topology again and redetermine the scheduling table.

In some embodiments, the scheduling table can be a gate control list (GCL).

The value of additional Ethernet capability announcement information is added in the data field of interaction information of the device supporting the time-sensitive network. The states, functions and supported preemption bytes of the device supporting time-sensitive network are limited by the value of additional Ethernet capability announcement information. At the same time, to ensure compatibility between a device supporting time-sensitive network and a device non-supporting time-sensitive network, identification and authentication for a device may be performed by bit configuration information. To facilitate the updating of time-sensitive network protocols, additional bytes are reserved for other function information expansion. As shown in Table 1, Table 1 exemplarily shows the data fields interacted between devices in the network.

TABLE 1

| Data Type, Length, Value (7 bits) | Information Character Length (9 bits) | Fixed Manufacturer ID (3 bytes) | 802.3 Type Field (8 bits) | Value of Additional Ethernet Capability Announcement Information (16 bits) | Manufacturer Information Code |
|---|---|---|---|---|---|

The value of additional Ethernet Capability announcement information is 16 bits in total, which is used to identify whether a device in the network supports time-sensitive networks or not. The function of each bit in the value of additional Ethernet capability notification information is defined as follows.

Bit [4:3] (i.e., the fourth bit and the fifth bit) refers to the minimum number of bytes of a data frame that can be preempted. To avoid multiple slicing overhead of time-sensitive data, it is specified that data less than 64 bytes cannot be preempted. In addition, in the process of preemptive transmission, in order to improve the reliability of time-sensitive data slice, the minimum size of the preempted time-sensitive data is 64*(1+size) bytes, where size represents the threshold of the minimum number of bytes of the data frame that can be preempted.

Bit [15:5] (i.e., the sixth bit to the sixteenth bit) is a reserved field, the initial value is 0, and the receiver does not process or identify information of the received reserved bits. Information of the reserved byte will not be transmitted either. If the data exceeds the specified number of bytes, it will be discarded.

Bit 0 (i.e., the first bit) indicates whether a device on the link supports the frame preemption function or not, a value of 1 indicates supporting, and the value of 0 indicates non-supporting. After obtaining the port information of the linked device, the time-sensitive network switch parses the port information. If the value of bit 0 is 1, it indicates that the linked device supports preemption function in the transmission direction. When the time-sensitive network switch, by the data link at the nearest network bridge group address, discovers that the value of additional Ethernet capability announcement information in the data field of the protocol indicates that the device linked with this time-sensitive network device supports preemption function, the frame preemption function can be enabled. When the MAC Merge sublayer receives a signal of link failure, it needs to turn off the preemption function.

Bit 1 (i.e., the second bit) indicates the state of the frame preemption function of the device supporting time-sensitive network on the link. The value of 1 indicates that the preemption function is on, and the value of 0 indicates that the preemption function is off.

Bit 2 (i.e., the third bit) indicates whether the frame preemption function of the device supporting time-sensitive network on the link is enabled or not. The value of 1 indicates that it is enabled, and the value of 0 indicates that it is disabled. The time-sensitive network switch first authenticates the enabling state of the device supporting time-sensitive network, and the frame preemption function is activated after determining that the enabling state is 1. When the preemption function of the device supporting time-sensitive-network is not verified, the MAC Merge sublayer initiates the verification. The verification depends on the sending of an authentication mPacket and the receiving of a responsive mPacket to confirm that the remote device has the preemption capability.

As shown in FIG. 1, a data transmission system in time-sensitive network includes network configuration operating system, industrial end station A, time-sensitive network switch 1, time-sensitive network switch 2, time-sensitive network switch 3, and industrial end station B. The network configuration operating system can be implemented as a server to plan the physical topology and data transmission path in the network.

Time-sensitive network switch 1, time-sensitive network switch 2, and time-sensitive network switch 3 separately identify values of additional Ethernet capability announcement information in data fields of interactive information of neighboring devices, and separately parse the identified values of additional Ethernet capability announcement information. The parsing results are shown in Table 2 below, for example, the neighboring devices support time-sensitive network or not, and the parsing results are stored in the time-sensitive network switch.

TABLE 2

| No. | Value of Additional Ethernet Capability Announcement Information | Whether neighboring device support preemption or not |
|---|---|---|
| 1 | 0000000000000111 | Support preemption of minimum 64 bytes |
| 2 | 0000000000001111 | Support preemption of minimum 128 bytes |
| 3 | xxxxxxxxxxxxx000 | Not support time-sensitive network and not support frame preemption |

Taking time-sensitive network switch 1 as an example, the devices linked with time-sensitive network switch 1 are industrial end station A and time-sensitive network switch 2. When industrial end station A is linked with time-sensitive network switch 1 through a cable, industrial end station A sends the port information corresponding to the cable to time-sensitive network switch 1. Similarly, when time-sensitive network switch 2 is linked with time-sensitive network switch 1 through a cable, time-sensitive network switch 2 sends the port information corresponding to the cable to time-sensitive network switch 1. If the time-sensitive network switch 1 obtains the value of the additional Ethernet capability notification information of the neighboring linked device by parsing, which is 0000000000000111, that is, bit 0 is 1, bit 1 is 1, bit 2 is 1, and bits 3 to 15 are all 0, which means that the linked device supports the frame preemption function, the frame preemption function is on, the frame preemption function is enabled, and the minimum number of bytes that can be preempted is 64 bytes.

The time-sensitive network switch can store the parsed information and upload the parsed information to the network configuration operating system. Before the time-sensitive stream transmission, the network configuration operating system obtains the IP addresses of time-sensitive network switch 1, time-sensitive network switch 2, time-sensitive network switch 3 on the link, and the IP addresses of industrial end station A and industrial end station B (storing in time-sensitive network switch 1 and time-sensitive network switch 3, respectively), initiates a request for retrieving network physical topology to each time-sensitive network switch by using the network management protocol YANG model, and determines the topology of the devices on the network link to be linear.

The network configuration operating system traverses the network topology and obtains the local clock type values, port reservation bandwidth sizes, and path planning tables of time-sensitive network switch 1, time-sensitive network switch 2, time-sensitive network switch 3 on the link according to the obtained IP addresses of devices supporting time-sensitive network. According to the communication paths between industrial end stations, the cycles, sizes and bounded latencies conditions of time-sensitive streams, XML configuration text is formed for port configuration of the time-sensitive network switch and distributed to the corresponding time-sensitive network switch. After the distribution, initial configuration is performed for the time-sensitive network switch. After the initialization, the state of time-sensitive network switch is updated to ready state. After all the states of time-sensitive network devices on the link are updated to ready states and all the states are reported to the network configuration operating system, the network configuration operating system can issue traffic transmission instructions after confirming the states of time-sensitive network switches on the link.

When a new time-sensitive network switch is added into the network or a new time-sensitive stream is generated, configuration can be performed again still in this way while the network is running. If the value of the additional Ethernet capability announcement information of any device on the network link is xxxxxxxxxxxxx000 (x indicates that this bit can be any value), it indicates that the device does not support time-sensitive network. The network configuration operating system does not issue the time-sensitive network configuration, and the device in the link directly conduct regular data exchange operations.

What has been described above is merely some preferred embodiments of the present disclosure. However, the scope of the disclosure is not limited thereto. Within the technical scope disclosed by the disclosure, equivalent changes or modifications according to the technical solution of the disclosure and its concept made by any person skilled in the art are intended to covered in the protection scope of the disclosure.

The invention claimed is:

1. A data transmission method in a time-sensitive network, applied to a data transmission system in the time-sensitive network, the system comprises a plurality of time-sensitive network switches, a plurality of industrial end stations, and a network configuration operating system, wherein each of the plurality of the time-sensitive network switches comprises one or more processors and one or more memories, and the method comprises:

for each of the plurality of time-sensitive network switches, determining, by the time-sensitive network switch, a device linked with the time-sensitive network switch, and storing, by the time-sensitive network switch, port information of the device, wherein the port information comprises a value of additional Ethernet capability announcement information;

based on the value of additional Ethernet capability announcement information of the device, determining, by the time-sensitive network switch, time-sensitive processing capability of the device to determine whether the device supports the time-sensitive network;

in response to determining that the device supports the time-sensitive network, transmitting, by the time-sensitive network switch, port information of the device and the time-sensitive network switch to the network configuration operating system;

based on the obtained port information, determining, by the network configuration operating system, an IP address of the time-sensitive network switch, and initiating, by the network configuration operating system, a request for retrieving physical topology to the time-sensitive network switch by using a network management protocol Yet Another Next Generation (YANG) model; and after receiving the request for retrieving physical topology from the network configuration operating system, sending, by the time-sensitive network switch, a local clock type value, a port reservation bandwidth size, and a path planning table of the time-sensitive network switch to the network configuration operating system according to an information table in the YANG model;

determining, by the network configuration operating system, the physical topology of the time-sensitive network based on the obtained port information; and planning, by the network configuration operating system, data transmission paths based on the physical topology of the time-sensitive network;

wherein, planning, by the network configuration operating system, the data transmission paths based on the physical topology of the time-sensitive network comprises:

obtaining, by the network configuration operating system, the local clock type values, the port reservation bandwidth sizes, and the path planning tables of the plurality of time-sensitive network switches based on the physical topology of the time-sensitive network, and collecting, by the network configuration operating system, network resource requirements through the plurality of time-sensitive network switches, wherein the network resource requirements comprise communication paths between the plurality of industrial end stations, and periods, sizes, and bounded latencies of time-sensitive streams;

according to the time-sensitive streams, the physical topology of the time-sensitive network and the network resource requirements, for each of the plurality of time-sensitive network switches, determining, by the network configuration operating system, a scheduling table of the time-sensitive streams for the time-sensitive network switch, and sending, by the network configuration operating system, the scheduling table to the time-sensitive network switch, such that the plurality of time-sensitive network switches conduct port traffic scheduling configuration according to received scheduling tables;

when a new time-sensitive network switch is added into the time-sensitive network or a new time-sensitive stream is generated, repeating, by the network configuration operating system, the above steps to plan the physical topology of the time-sensitive network again and redetermine a scheduling table.

2. The method according to claim 1, wherein the time-sensitive network switch is connected by a single point-to-point network to operate.

3. The method according to claim 1, wherein the value of the additional Ethernet capability announcement information is 16 bits in total, of which bit 0 indicates whether frame preemption function is supported or not, bit 1 indicates a state of the frame preemption function, bit 2 indicates whether the frame preemption function operation is enabled or not, bit [4:3] indicates a minimum number of bytes of the preemption frame, and bit [15:5] is a reserved field.

4. The method according to claim 3, wherein, for the bit 0, a value of 1 indicates that the frame preemption function is supported, and a value of 0 indicates that the frame preemption function is not supported; for the bit 1, a value of 1 indicates that the frame preemption function is on, and a value of 0 indicates that the frame preemption function is off; for the bit 2, a value of 1 indicates that the frame preemption function is enabled, and a value of 0 indicates that the frame preemption function is disabled.

5. A data transmission system in a time-sensitive network, comprising: a plurality of industrial end stations, a plurality of time-sensitive network switches and a network configuration operating system, wherein, each of the plurality of the time-sensitive network switches comprises one or more processors and one or more memories, and for each of the plurality of time-sensitive network switches, the time-sensitive network switch is configured to:

determine a device linked with the time-sensitive network switch and store port information of the device, wherein the port information comprises a value of additional Ethernet capability announcement information;

determine, based on the value of additional Ethernet capability announcement information of the device, time-sensitive processing capability of the device to determine whether the device supports the time-sensitive network;

transmit, in response to determining that the device supports the time-sensitive network, port information of the device and the time-sensitive network switch to the network configuration operating system, such that based on the obtained port information, the network configuration operating system determines the IP address of the time-sensitive network switch, and uses a network management protocol Yet Another Next Generation (YANG) model to initiate a request for retrieving physical topology to the time-sensitive network switch; and in response to receiving the request for retrieving physical topology from the network configuration operating system, send a local clock type value, a port reservation bandwidth size, and a path planning table of the time-sensitive network switch to the network configuration operating system according to an information table in the network management protocol YANG model;

the network configuration operating system is configured to:

determine the physical topology of the time-sensitive network based on the obtained port information; and plan data transmission paths based on the physical topology of the time-sensitive network;

wherein, planning the data transmission paths based on the physical topology of the time-sensitive network comprises:

obtaining the local clock type values, the port reservation bandwidth sizes, and the path planning tables of the plurality of time-sensitive network switches based on the physical topology of the time-sensitive network;

collecting network resource requirements through the plurality of time-sensitive network switches, wherein the network resource requirements comprise communication paths between the time-sensitive network switches, and periods, sizes, and bounded latencies of time-sensitive streams;

according to the time-sensitive streams, the physical topology of the time-sensitive network and the network resource requirements, for each of the plurality of time-sensitive network switches, determining a scheduling table of the time-sensitive streams for the time-sensitive network switch, and sending the scheduling table to the time-sensitive network switch, such that the plurality of time-sensitive network switches conduct port traffic scheduling configuration according to received scheduling tables;

when a new time-sensitive network switch is added into the time-sensitive network or a new time-sensitive stream is generated, repeating the above steps to plan the physical topology of the time-sensitive network again and redetermine a scheduling table.

6. The system according to claim 5, wherein the time-sensitive network switch is connected by a single point-to-point network to operate.

7. The system according to claim 5, wherein the value of the additional Ethernet capability announcement information is 16 bits in total, of which bit 0 indicates whether frame preemption function is supported or not, bit 1 indicates a state of the frame preemption function, bit 2 indicates whether the frame preemption function operation is enabled or not, bit [4:3] indicates a minimum number of bytes of the preemption frame, and bit [15:5] is a reserved field.

8. The system according to claim 7, wherein, for the bit 0, a value of 1 indicates that the frame preemption function is supported, and a value of 0 indicates that the frame preemption function is not supported; for the bit 1, a value of 1 indicates that the frame preemption function is on, and a value of 0 indicates that the frame preemption function is off; for the bit 2, a value of 1 indicates that the frame preemption function is enabled, and a value of 0 indicates that the frame preemption function is disabled.

* * * * *